March 14, 1950     C. A. PUGH ET AL     2,500,618
LIQUID CONTROL APPARATUS Filed Dec. 4, 1943     9 Sheets-Sheet 4

Inventors:
Cyril Alphonso Pugh
Douglas Gerhard Booth
By: William E. P. Bayly
Attorney.

March 14, 1950 C. A. PUGH ET AL 2,500,618
LIQUID CONTROL APPARATUS
Filed Dec. 4, 1943 9 Sheets-Sheet 5

Inventors:
Cyril Alphonso Pugh.
Douglas Gerhard Booth.
By: William E. P. Bayly
Attorney.

March 14, 1950 C. A. PUGH ET AL 2,500,618
LIQUID CONTROL APPARATUS
Filed Dec. 4, 1943 9 Sheets-Sheet 6

Fig. 8.

Inventors:
Cyril Alphonso Pugh.
Douglas Gerhard Booth,
By: William E. P. Boyle
Attorney.

March 14, 1950 C. A. PUGH ET AL 2,500,618
LIQUID CONTROL APPARATUS
Filed Dec. 4, 1943 9 Sheets-Sheet 7

Fig. 9.

Inventors:
Cyril Alphonso Pugh.
Douglas Gerhard Booth.
By: William C. Boyle
Attorney.

Patented Mar. 14, 1950

2,500,618

UNITED STATES PATENT OFFICE 2,500,618

LIQUID CONTROL APPARATUS

Cyril Alphonso Pugh and Douglas Gerhard Booth, Ilford, England, assignors to The Plessey Company Limited, Ilford, England, a British company Application December 4, 1943, Serial No. 512,936
In Great Britain November 11, 1942

9 Claims. (Cl. 123—119)

This invention relates to improvements in or a modification of a liquid control apparatus of the type shown and described in our United States Patent No. 2,401,883 in which there is provided the combination of a valve casing having a port for the passage of liquid, the flow of which is to be controlled, a movable main valve member in the valve casing adapted to close or open said port and having a valve opening pressure face subjected to the pressure of the liquid approaching said port, and also a valve closing pressure face which is larger than the area of the valve opening pressure face and is subject to the pressure of liquid in a control chamber, said control chamber situated in a by-pass passage leading from the high pressure side of the port to the low pressure side and two leaks in said by-pass passage arranged on opposite sides of the control chamber and means provided for relative adjustment of the leaks.

Such a regulating means will be referred to hereinafter as "regulating means of the type described."

The present invention comprises a regulating means of the type described and has for its primary object to provide an all speed governor for controlling the speed of an engine or other fuel consuming means, which is highly efficient, stable and sensitive at all pressures and which is not dependent upon the use of spring means for its loading or stability.

A further object of this invention is to provide means for loading the governor to any predetermined value.

A still further object of this invention is to provide means for adjusting the load on the governor so as to regulate the rate at which the load is increased or decreased thereby giving full control of speed and acceleration from a single operating lever.

Another object of the invention is to provide a governor applicable, but not exclusively, to internal combustion engines, whereby the speed of the engine is maintained constant at any predetermined value, irrespective of any change of conditions, such as for example, fuel and air temperature, fuel and air density, and fuel calorific value, and in the case where it is applied to engines for aircraft irrespective of altitude.

A still further feature of the invention is to provide a system of speed governing which utilises a constant delivery engine driven pump arranged to give an excess delivery over the whole speed range of the engine in which governing is achieved by controlling a by-pass valve which returns a portion of the pump delivery to the suction side of the pump.

Other objects of the invention will be apparent from the following description and accompanying drawings taken in connection with the appended claims.

The invention comprises the features of construction, combination of elements, arrangements of parts and operation which will be brought and exemplified in the disclosure hereinafter set forth including the illustration in the drawings.

In the drawings various arrangements of the invention are shown diagrammatically by way of example for use with internal combustion engines used in aircraft, but it is to be understood that the invention is not limited to internal combustion engines.

Fig. 11 is a schematic view of the liquid control device applied to an engine.

The invention broadly consists of a means for regulating one of the leaks by means of a hydraulically loaded all speed governor, in which the loading thereof is automatically controlled from any source of fluid pressure, the arrangement being such that the pressure of the fluid serving the engine is automatically regulated to prevent any undue fluctuation of engine speed.

This said hydraulically loaded governor controls a small pilot valve, through which a supply of fluid is taken to the control chamber of a differential by-pass valve. An orifice is arranged so that a bleed exists from the control chamber provided in the regulating means of the type described and allows a small flow through the circuit. Thus in the event of an increase of speed, the pilot valve closes allowing the by-pass valve to open and by-pass a larger portion of the fuel pump delivery, thus reducing the pressure from the source of supply to the engine thereby reducing the speed of the engine. In the event of the speed falling, the reverse takes place thus causing a rise in engine speed.

A feature of the invention is that a constant flow valve and a sensitive relief valve are provided which co-operate with the governor in such a manner that the loading thereof is obtained by directing and automatically controlling a portion of the high pressure fluid to load the governor at the desired value in opposition to the centrifugal action of the weight or mass of said governor. This said constant flow valve preferably consists of a simple valve arranged to maintain a constant pressure drop across an orifice thus ensuring a constant supply of fluid through the circuit irrespective of variations in pressure of the supply.

The sensitive relief valve preferably consists of a spring loaded floating seat type of valve having a large controlling area with a relatively small seat which gives an accurate control of pressure with a minimum of force required to operate the control.

A still further feature of the invention is that a valve is incorporated in the circuit in order to ensure that the high pressure supply does not fall below the pressure required to maintain a constant flow through the orifice of the constant flow valve, thus preventing underspeeding after de-celeration. The minimum pressure therefore, of the high pressure fluid will not fall to a pressure less than that required to maintain the governor loading circuit.

A further feature of this invention is that means are provided to regulate the acceleration of the engine. The method by which this acceleration control is effected can be varied to suit particular engine requirements and can be achieved by regulating the rate at which the hydraulic loading of the governor is applied. For engines where the acceleration may be uniform at all altitudes an acceleration that varies inversely as the square of the speed can be obtained by adjusting the flow from the constant flow valve and the capacity of the governor loading relief valve.

Where it is necessary to maintain a rate of acceleration to a predetermined law over the speed range irrespective of altitude, a spring or fluid driven follow-up servomotor can be used to operate the governor loading relief valve.

According to one form the governor loading relief valve consists of a single valve which is operated by a control lever, and said valve is provided with a movable valve seating, the opposite ends of the valve communicate with the governor loading means and governor housing respectively.

According to another form of governor loading control valve, there are two valves provided, one of which is used for starting purposes and the other for running purposes. These two said valves will hereinafter be referred to as the "starting valve," and "running valve" respectively. In this arrangement a third valve is incorporated in the circuit between the starting valve and running valve, which is adapted to shut off the fluid to the starting valve when switching over to the running valve, this said valve will hereinafter be referred to as the "isolating valve," and electrical means may be provided for operating this said isolating valve. The starting valve is adapted to cover the range from zero to idling revolutions of the engine and the running from the idling to the maximum speed.

A combined electrical and mechanical means are preferably provided for actuating the running valve and starting valve respectively, any suitable clutch is associated with the running valve which is operated by the control lever and driven by means of an electric motor, and a solenoid type of clutch is associated with the starting valve which operated in conjunction with the isolating valve.

Various methods may be provided for operating the governor loading control valve, for example a spring driven follow up servomotor may be provided in which spring control means regulate the movement of the valve when increasing speed from zero to maximum, and said valve is manually operated through gearing when decreasing speed also said spring is energised by this said manual operation.

Figure 1:
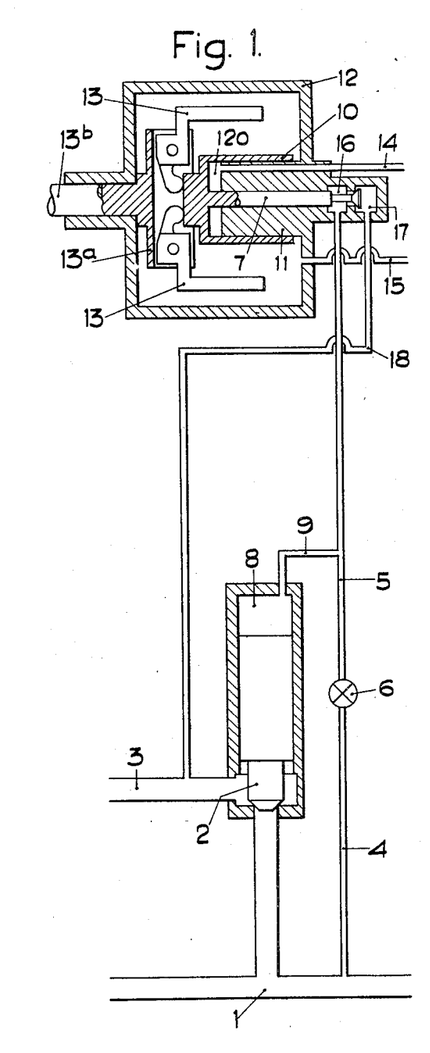
Figure 1 shows diagrammatically one construction in which the governor controller leak is arranged between the larger end of a by-pass valve and the low pressure side of a fluid circuit.

Referring to Figure 1, the conduit 1, providing a feed of fluid from a source of high pressure supply to an engine, has a differential by-pass valve 2 interposed between said high pressure supply and a low pressure conduit 3 which when open allows fluid to escape from the high pressure conduit to the low pressure conduit 3 to reduce the pressure P in conduit 1. Another conduit 4 branching from conduit 1 supplies fluid to conduit 5 past a leak or restriction 6. Said conduit 5 feeds a governor-operated pilot valve 7 (which is in balance with respect to the $P_s$ in conduit 5) and also a valve control chamber 8 containing the differential by-pass valve 2 by the conduit 9. The pressure P in the conduit 1 is determined by the position of the by-pass valve 2 which is in turn controlled by the operation of the pilot valve 7. It will be seen that in Figure 1 the restriction 6 is arranged between the high pressure conduit 1 and the control chamber 8 of the by-pass valve 2, said restriction 6, together with the pilot valve 7, will effect control of the by-pass valve 2. In other words, the pilot valve 7 constitutes a variable leak or orifice in series with the restriction 6. A cylinder 10 integral with the pilot valve 7 is slidably mounted upon a hub 11 formed in the governor housing 12, thereby providing a fluid chamber 120, the movement of the pilot valve 7 through the central axis of said hub 11 is determined by the cylinder 10. The position of the cylinder 10 is, in turn determined by the condition of balance between the force exerted by the governor weights 13 which act on the end of the cylinder 10 and the hydraulic load applied to the end thereof. The hydraulic load acting on the end of said cylinder 10 is determined by the pressure difference $P_G$ existing across the conduits 14, 15 by reason that the conduit 14 communicates with the cylinder chamber 120 and conduit 15 with governor housing 12. The governor weights 13 are pivotally connected in a cage or carrier 13a on the end of shaft 13b which is driven from the engine. The housing 11 has two inter-communicating valve chambers 16, 17 which are separated by the pilot valve 7 closing on a valve seating in chamber 17 and the chamber 16 communicates with the high pressure conduit 1 by way of conduits 4 and 5 and restriction 6 so that the flow past the pilot valve 7 into chamber 17 is returned to the low pressure conduit 3 by way of conduit 18.

In operation the valve 7 moves to and from its seat under the action of the centrifugal load applied by the governor weights 13 which are sensitive to change of speed. Thus the control of the pressure P and hence the engine speed is effected in the following manner. From the position of a pre-determined equilibrium should the engine speed rise the governor weights 13 move outwards and open the valve 7 and allows the differential by-pass valve 2 to open and allow more fluid from the conduit 1 to be by-passed into the conduit 3. The pressure P in the conduit 1 will then fall and cause a reduction in the engine speed. When the equilibrium speed is again reached, the valve 7 tends to close causing the differential valve 2 to move towards its seat to sustain the pressure P in the conduit 1 at the required value to give the pre-selected engine or equilibrium speed. The reverse takes place should the engine speed fall below the pre-selected equilibrium speed.

The valve 2 is preferably urged towards its seat by a light spring in order to ensure that it is closed when starting the engine.

Figure 2:
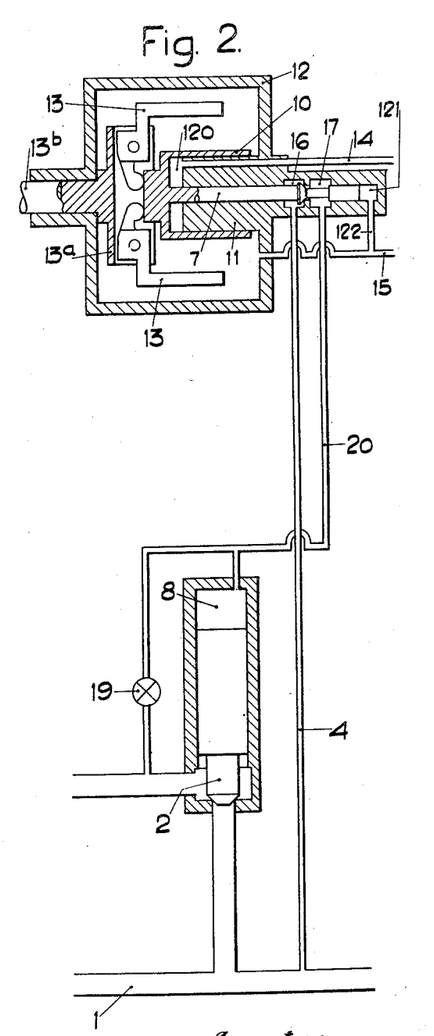
Figure 2 shows a modification of the fluid circuit in which the governor controlled leak is arranged between the high pressure side of a fluid circuit and the larger end of a by-pass valve.
Figure 2:
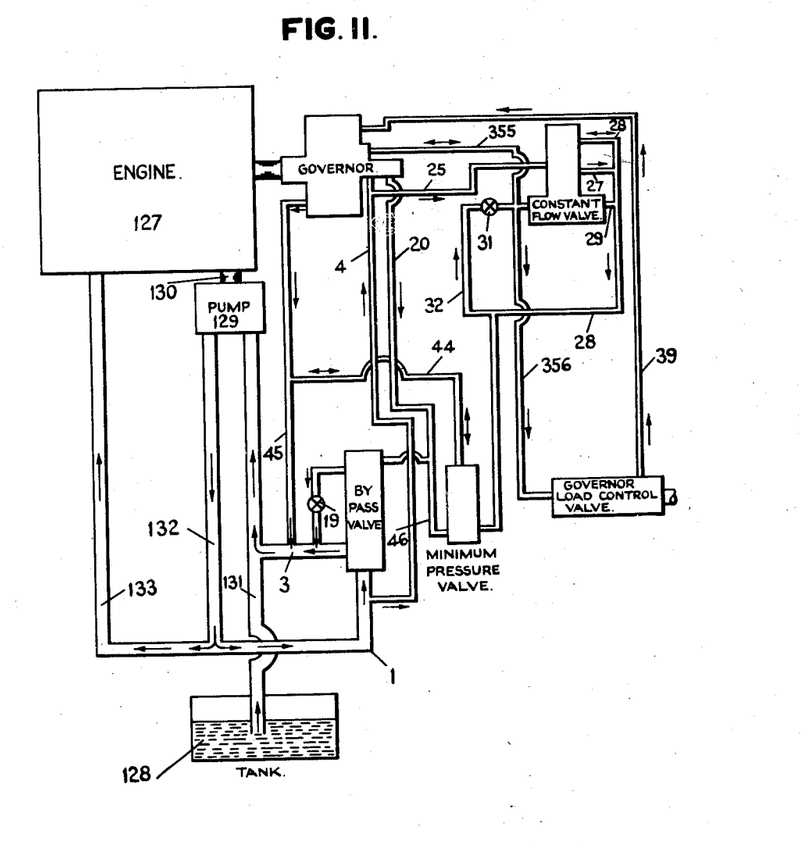

Referring to Figure 2 which shows an arrangement in which the governor controlled leak is situated between the high pressure side of the circuit and larger end of the by-pass valve. From the conduit 1 which supplies fluid under pressure to the engine and contains a by-pass valve 2, a supply of fluid is taken via the conduit 4 to the governor-controlled pilot valve 7 contained in chamber 16 and from there through chamber 17 to the control chamber 8 of the differential by-pass valve 2 and to an orifice 19 to the low pressure conduit 3 by way of conduit 20.

The pilot valve 7 is a valve constructed so that it is in balance both to the inlet and outlet pressures and is arranged to restrict the flow of fluid from the high pressure conduit 1 to the control chamber 8 to a greater amount as the governor speed increases from a pre-selected datum. In this arrangement the hub 11 is provided with a small fluid chamber 121 into which terminates the end of the stem of pilot valve 7 and said chamber 121 communicates with conduit 15 through branch conduit 122 so that the fluid pressure acting on the end of the pilot valve stem is in opposition to that acting on the cylinder 10 in housing 13, and is therefore completely balanced.

The parts 12, 13, 13a, 13b of the hydraulic governor are constructed and arranged substantially as described with reference to Figure 1, also a light spring may be provided for urging the valve 2 on to its seat for starting purposes as herein set forth.

Figure 3:
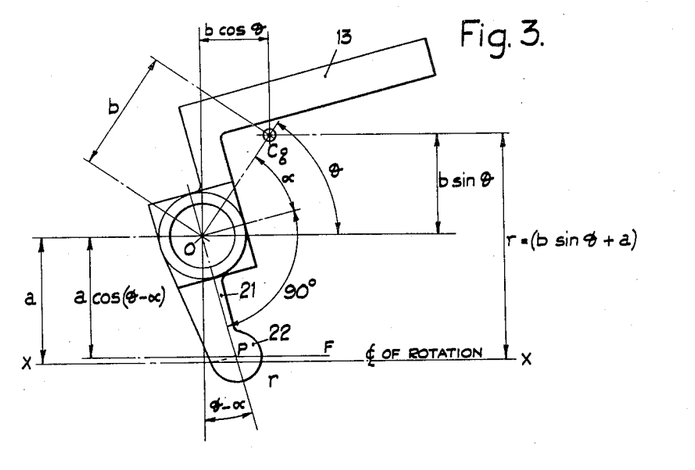
Figure 3 shows the design of one of the governor weights and terms used.

The position of the by-pass valve 2 controls the pressure in the conduit 1. In the event of an increase in speed the pilot valve offers a greater restriction and the by-pass valve 2 will open until the main fuel pressure falls to a level that allows the speed to return to its pre-set value, should the speed decrease the reverse occurs. The speed at which the system governs will depend on the pressure difference $P_G$ applied across the inside and outside of the cylinder 10 via the conduits 14 and 15. According to this balance the position of the pilot valve is adjusted. To clarify the description and operation of the governor, a brief description of the weight 13 and the terms used is given.

Referring to Figure 3, it will be seen that the weight consists of a mass of material pivoted about a point O, also pivoted about the point O and attached to the mass is an arm 21 on the end of which is a thrust pad 22. The profile of the thrust pad 22 is circular, therefore, at whatever angle the pad 22 is presented against the flat face of the loading cylinder 10 (Figures 1 and 2), the line of force F passes through the same point P.

$a$ is the angle between the centre line of rotation XX and a line that cuts both the point O and the centre of gravity $C_g$ of the mass and arm when a line that cuts both the points O and P is at 90° to XX.

$\theta$ is the angle between the line XX and a line that cuts both O and $C_g$ when the weight is displaced (as shown). Therefore $(\theta - a)$ is the angular displacement of the weight and when = it is said to be in the normal position.

$b$ is the distance between O and $C_g$.

$a$ is the distance between O and P and is also, on this weight, the distance between O and the line XX.

$M$ = total weight of the mass, arm and etc. that rotates about O.

$g$ = acceleration due to gravity.

$\omega$ = angular velocity about the line XX.

Then from the construction described it will be seen that the force $$F = \frac{\frac{M}{g}\frac{b}{a}\omega^2(b\sin\theta + a)}{\cos\alpha + (\sin\alpha \tan\theta)}$$

The governor normally operates so that the angle $(\theta - a)$ is very small, therefore, the effect of the change in the effective length of the arm is very small indeed, i. e. the change, assuming $a=1$ will be $$1 - \cos(\theta - a)$$

which, for an angular displacement of 2° is .0006 or 6 in 10,000.

Figure 4:
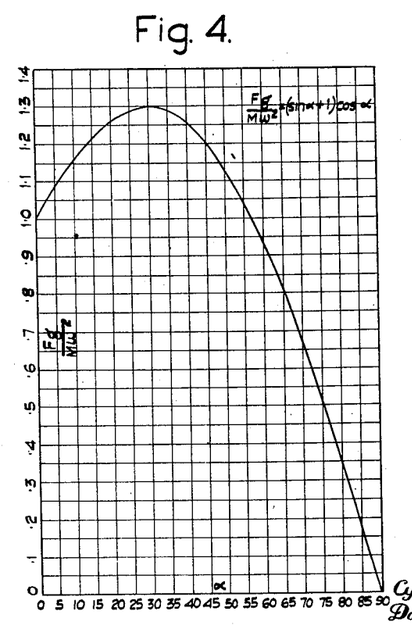
Figure 4 shows a curve for the values given with reference to the governor weight in Figure 3.

Then giving values to $a$ and $b$ of 1 and assuming that $\theta = a$ the formulae becomes $$F = \frac{M}{g}\omega^2(\sin\alpha + 1)\cos\alpha$$

and we are able to plot $$\frac{F_g}{M\omega^2}$$

against $a$ . . . Fig. 4.

The graph (Fig. 4) shows the effect of varying the angle $a$ and it will be seen that a governor constructed to operate against a dead load must be arranged with the value for $a$ selected so that the slope of the graph is negative i. e. so that an increase in radius of the $C_g$ of the weight results in a decrease in F. The rate of the governor will be determined by the slope of the curve for the selected value of $a$ and will be proportional at all speeds to the load F.

The determination of the rate by measuring the slope of the curve will only be an approximation as the rate will vary with different values of $(\theta-a)$ obtained in practice but which are neglected in the formulae used to construct the graph.

The rate may be accurately determined by using the formulae $$\text{Rate} = \frac{Mb\omega^2}{ga}\left(\frac{(b\cos\theta)}{(\cos\alpha+\sin\alpha\tan\theta)} - \frac{(b\sin\theta+a)(\sin\alpha\sec^2\theta)}{(\cos\alpha+\sin\alpha\tan\theta)^2}\right)$$

In operation the force F from two or more weights 13 is balanced hydraulically by applying a fluid pressure to the cylinder 10, or to a diaphragm or other suitable loading device. The control at any speed, the hydraulic pressure is adjusted and maintained constant to give that speed. Then any variation from the set speed will result in an increase or decrease in the force F which will cause the radius of the $C_g$ of the weight to increase or decrease until a balance with the hydraulic force is again obtained. It is this movement that is conveyed to the pilot valve 7 and so causes the speed to be returned to its set value.

In either of the arrangements shown in Figures 1 and 2 it will be seen that the pilot valve 7 operates in the same position for any pressure, i. e. it only moves to adjust the by-pass valve 2 and when the adjustment is made it must return to its normal position. Thus it can be seen that a very accurate control of speed is obtained and provided the pilot valve 7 is accurately balanced, the governing will be independent of the pressure required.

This can be proved as follows:

Let
R=ratio of the differential valve.
P=main fuel pressure.
$P_s$=servo pressure.
$A_1$=area of restriction between high pressure and by-pass valve.
$A_2$=area of restriction between by-pass valve and low pressure.

Flow through both orifices must be equal.

$$\therefore A_1\sqrt{P-P_s}=A_2\sqrt{P_s} \text{ so } \frac{A_1}{A_2}=\sqrt{\frac{P_s}{P-P_s}}$$

and as $$P_s=PR\frac{A_1}{A_2}=\sqrt{\frac{R}{1-R}}$$

This indicates that for equilibrium the ratio of the area $$\frac{A_1}{A_2}$$

is constant for all pressures and the pilot valve moves only to adjust the position of the by-pass valve and when the speed is corrected, returns to its nominal position, irrespective of any change of pressure.

Referring to the circuit shown diagrammatically in Figure 5, the component parts of the hydraulic governor are the same as herein described with reference to Figures 1 and 2 and like reference numerals refer to similar parts. Included in this circuit is a constant flow valve 23 which is adapted to ensure a uniform supply of fluid being maintained in the governor loading circuit, said constant flow valve 23 consists of a conical valve 24 which is connected to and in balance with the high pressure in conduit 1 through conduit 4 and branch conduit 25 and is controlled by the movement imparted to it due to the variation of the position of balance of a spring loaded diaphragm 26. Movement of the valve 24 allows the flow of fluid through its seating, conduits 27, 28 and 29 to the side of the diaphragm 26 on which the fluid pressure opposes the spring 30 and also to an orifice 31 in conduit 32 connected to conduit 28, after passing the orifice 31 the flow passes to the opposite side of the diaphragm 26 and this lower fluid pressure thus actuates to assist the spring to load the diaphragm 26. A connection to the rest of the circuit is branched from this lower pressure line.

The valve 24 moves towards the closed position as the load on the diaphragm 26 increases to oppose the spring, thus it will be seen that this arrangement maintains a constant pressure drop across the orifice 31 and provides a constant flow and as the valve is in balance with the high pressure side of the circuit, the flow is independent of any change of pressure that may occur in the supply.

From the low pressure side of the constant flow valve 23 connections are made to the chamber 120 of the loading cylinder 10 and to a governor loading relief valve 33 by way of conduits 355 and 356 respectively which are interconnected with conduit 32. Said governor loading relief valve maintains the pressure at a predetermined constant value in the governor loading chamber 120 and consists of a conical valve member 34 to which a control rod 38 is permanently attached and passes through a seat 35 slidably mounted in the valve body 33. The sliding seat 35 is urged towards the conical valve by spring 37 which spring constitutes the loading on the relief valve. A light spring 36 acting between the head of the conical valve member 34 and the end of the housing 33 assists the fluid pressure acting on the head of the conical valve to move it towards the sliding valve seat 34. The pressure at which the valve controls is determined by the position of the conical valve member 34 which is controlled externally by the rod 38. Thus with the position of the conical valve 34 fixed the sliding seat 35 loaded by the spring 37 moves to control the pressure.

This arrangement provides a large area on which the fluid pressure acts and allows the use of a large controlling force with a relatively small seat, thus the force required to move the conical valve for adjustment of the controlling pressure is very small as the spring-load acting on the sliding seat is balanced by the pressure acting against the face of the seat and the load on the control rod 38 to which the conical valve 34 is attached is determined by the pressure acting on the small valve area together with the load of the spring 37, both forces being very small.

The by-pass from the governor loading relief valve 33 is taken to the low pressure side of the circuit via the governor housing 12 through conduit 39 so that the same pressure exists in governor housing 12 as exists at the rear of the sliding valve seat 35, thereby ensuring that any pressure change in the low pressure lines does not influence the pressure difference existing between the inside and outside of the governor loading cylinder 10.

A minimum pressure valve 40 consisting of a conical valve 41 attached to a valve stem 42 the end of which terminates in a chamber 43 is connected to the low pressure side of the circuit by conduits 44, 45. Said conical valve 41 is arranged so that the ratio of the area of the seat to the area of the seat minus the area of the stem 42 is in the same ratio as the area of the larger to the smaller end of the differential by-pass valve 2a and connection is made from the constant flow valve intermediate pressure, that is to say, the pressure prior to the orifice 31 to the underside of the head of the valve 41 and from the top side of the head a connection is made to the larger end of the by-pass valve 2a by conduit 46, which latter is interconnected with conduit 20.

The minimum pressure valve 40 ensures that should the pressure, acting on both the larger end 47 of the by-pass valve 2a and the conical end 41 of the valve 40, tend to fall below the value required to maintain the pressure in the high pressure line 1 at a value that will give a constant flow through the orifice 31 and thus through the governor loading circuit, the minimum pressure valve 40 will open and cause the by-pass valve 2a to maintain the high pressure line at the required minimum value by loading the valve 2a independent of the speed of the governor.

The by-pass valve 2a is mounted in a piston 41 and a spring 48 interposed between the valve 2a and the valve casing which tends to urge the valve 2a on its seat for starting purposes. Said piston 47 is in turn connected to valve 2a by a spring 49 which actuates as a buffer for the by-pass valve 2a.

Although a modified form of by-pass valve has been described with reference to Figure 5 the more simpler form of by-pass valve as herein described with reference to Figures 1 and 2 may be incorporated in Figure 5 and vice versa.

Figure 5:
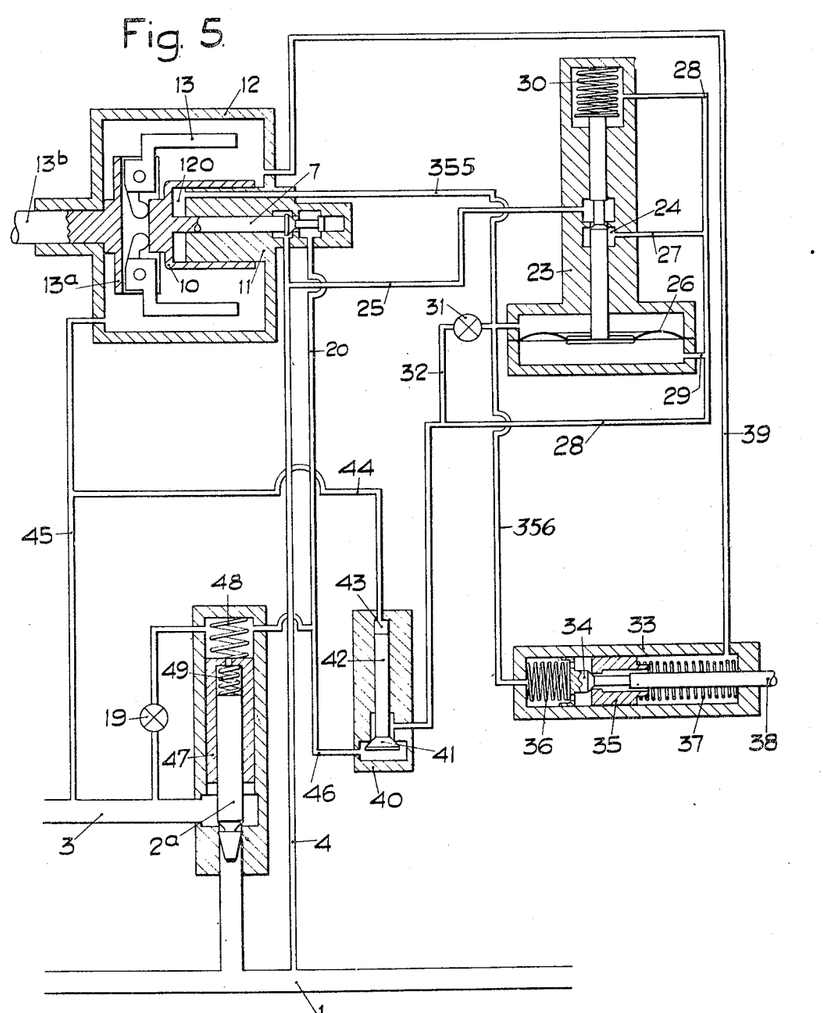
Figure 5 shows diagrammatically one form of complete circuit.
Figures 6, 6A:
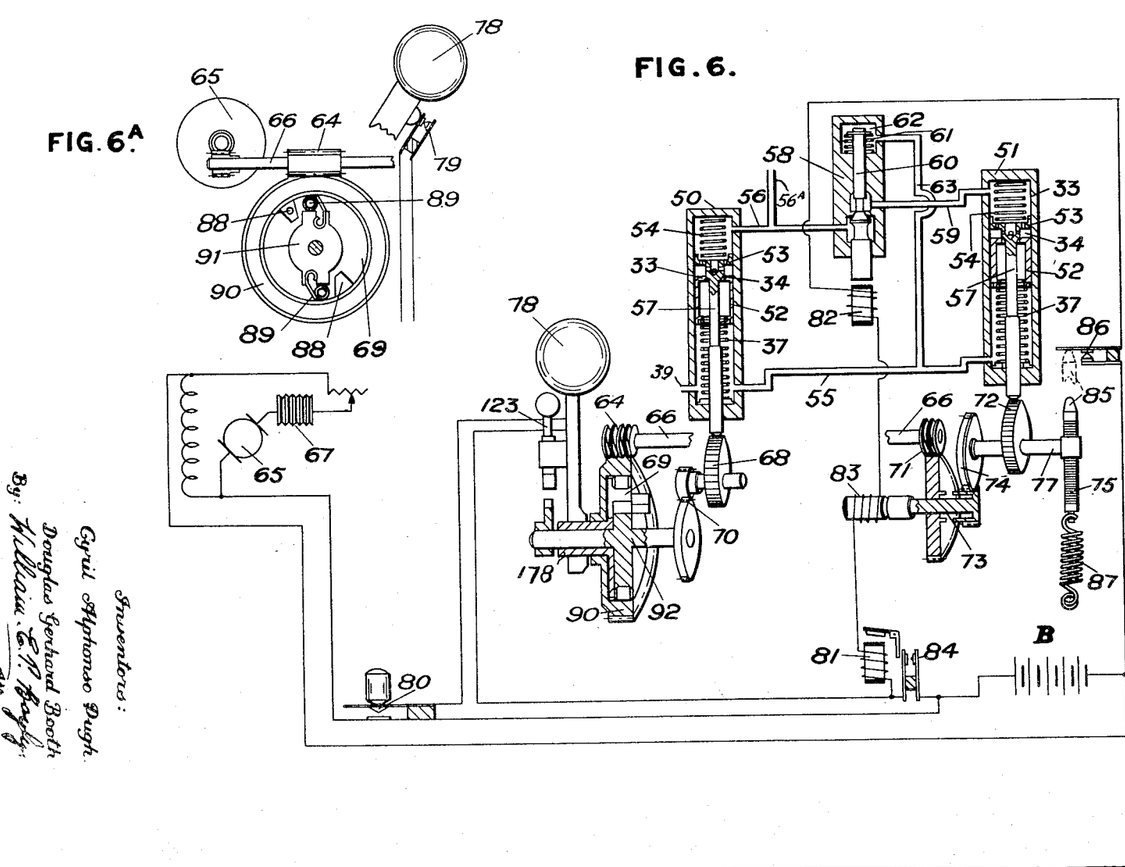
Figure 6 shows one arrangement of control for the hydraulic governor.
Fig. 6a is a detail of the control for the hydraulic governor.
Figure 7:
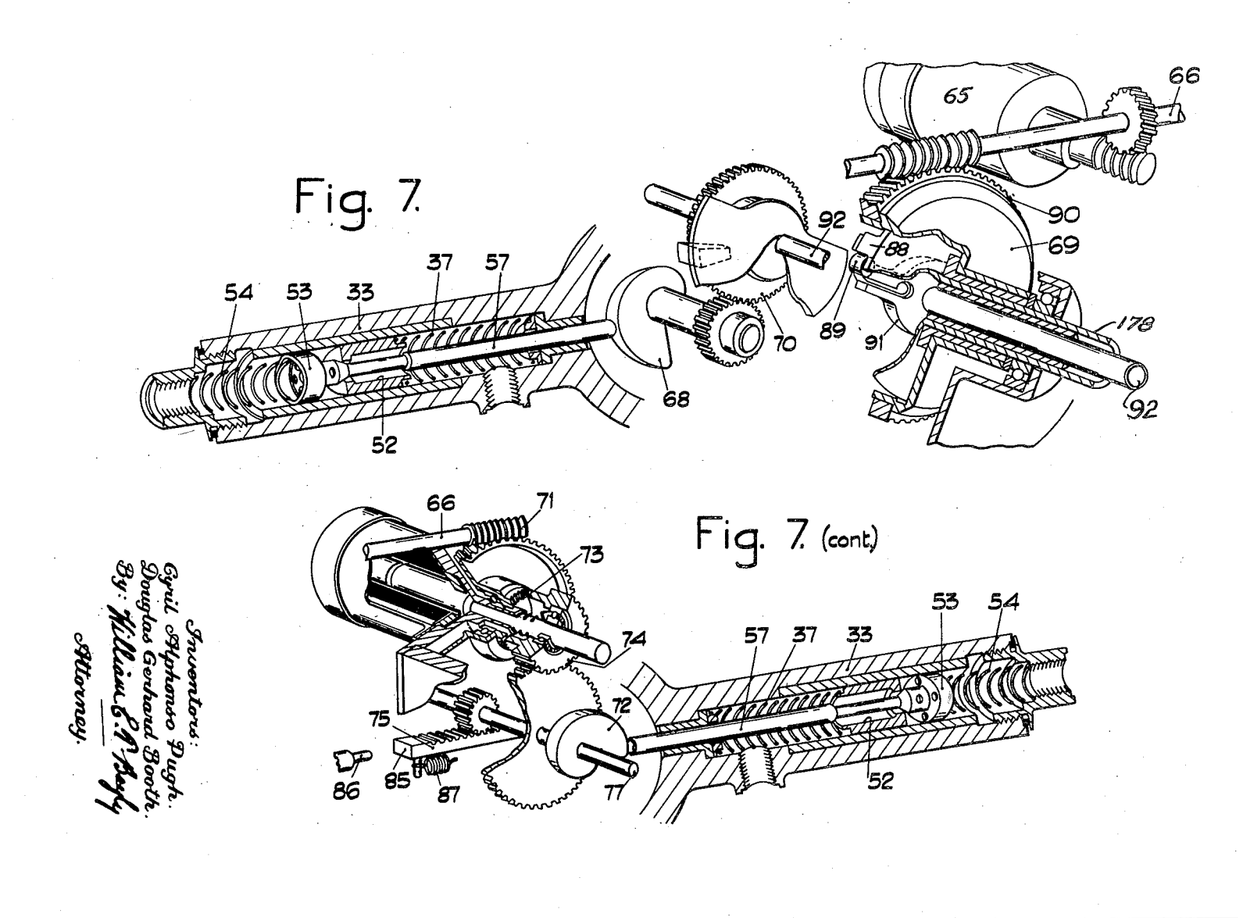
Figure 7 is an exploded view of the mechanism shown in Figure 6.

The control mechanism shown in Figures 6, 6a and 7 consists of a running valve 50 and a starting valve 51 which are substituted in place of the governor loading relief valve 33 in Figure 5. Both these said valves 50 and 51 are of similar construction to the valve 35 Figure 5, above described, comprise a conical valve 34 whose seating is formed in the end of a sleeve 52 which slide in the housing 33. The valve 34 on one side is formed with a stem 57 and in the opposite side terminates into a perforated cup shape member 53 which receives the end of a light helical spring 54, the opposite end of this spring abuts against the end of the housing 33 thereby tending to close the valve 34 on its seating. A second helical spring 37 is interposed between the sleeve 52 and opposite end of the housing 33 and is adapted to urge the sleeve 52 towards the valve 34. Both the running valve 50 and starting valve 51 are interconnected by conduit 55 to the conduit 39 leading to the low pressure side of the circuit via governor housing 12 (Figure 5) and at the opposite end, the running valve 50 is directly connected by conduit 56 to the conduit so leading to the chamber 120 of the governor loading cylinder 10 (Figure 5). Said conduit 56 is connected to a branch pipe 56a for admission of liquid fuel from conduit 356 (Fig. 5). Conduit 56 is also connected to an isolating valve 60 mounted in the valve body 58 which in turn is connected by conduit 59 to the starting valve 51 at the end remote to the connection of conduit 55, so that when the isolating valve 60 is open the conduit 59 is placed into communication with conduit 56.

The isolating valve 60 is normally held on its seat by a spring 61 in a chamber 62 said chamber being connected to the low pressure side of the circuit by conduits 63, 55 and 39 and electrical means are provided for opening the isolating valve 60 as hereinafter set forth.

An electric motor 65 drives the lay shaft 66. This motor is wound so that the speed may be adjusted by means of a variable resistance in the armature circuit controlled by a barometric capsule 67 of known construction. Said lay shaft 66 through worm 64 and worm wheel 90 integral with outer clutch ring drives a cam 68 through a roller clutch 69 of known kind, and gearing 70, thereby actuating the running valve 50. Said motor 65 through the lay shaft 66 and another worm 71 drives a second cam 72 through a solenoid operated clutch 73 of known type, and gearing 74 for operating the starting valve 51. A rack 75 (Figure 7) driven by the gear 76 fixed to the cam shaft 77 is adapted to operate a switch mechanism for changing over from the starting valve to the running valve, as hereinafter described.

The starting valve 51 is arranged to cover the speed range from zero to idling revolutions and the running valve 50 from the idling to the maximum speed, by suitably arranging the strength of the springs 37 and 54, the control of these said valves is effected in the following manner. To start the engine, a control lever 78 is moved in a clockwise direction to the minimum speed position as shown in Fig. 6a; this causes the cam 68 to move the running valve 50 to the minimum position and closes the switch 79. The push button switch 80 is then depressed, thereby completing the circuit through the windings of the solenoids 81, 82 and 83 and battery B, which latter energizes said solenoids 81, 82 and 83.

On energising the solenoids, the switch 84 is closed to maintain the circuit when the push button switch 80 is released, the isolating valve 60 is opened to allow the starting valve 51 to control the governor loading pressure, and the clutch 73 is engaged. The cam 72 is rotated at a speed fixed by the gear ratio between the motor and the cam shaft, and allows the starting valve 51 to increase the governor loading pressure at the desired rate until the running valve 50 is in operation.

After a sufficient overlap, to ensure a smooth change-over, from the starting valve to the running valve, the stud 85 is attached to rack 75 and driven by the gear 76 (Figure 7) on the cam shaft 77, opens the switch 86 and allows the isolating valve 60 to close, the switch 84 to break, and the clutch 73 to disengage, allowing the spring 87 to return the cam 72 and the starting valve 51 to the zero speed position. The unit is thus left after the starting cycle is completed, running at the minimum idling speed.

For any further increase of speed, the control lever 78 is moved in an anti-clockwise direction, this rotates shaft 178 moving the stop 88 away from the roller 89 allowing the roller 89 to engage between the rotating outer clutch ring 90 and the clutch cam plate 91. The cam 68 is then rotated through gears 70 by the shaft 92 of the clutch until the outer ring 90 which being driven by the electric motor 65 brings the roller 89 into engagement with the stop 88 and thus disengages the roller.

To reduce speed the lever 78 is moved in the opposite direction causing the stop 88 to contact the cam plate 91 which rotates the cam 68 to a lower speed position. The clutch and cam provides a very sensitive adjustment of speed and any desired acceleration law may be obtained by suitably shaping the profile of the cams.

With the arrangement shown the motor is intended to run continuously and a clutching device 123 is fitted to connect the lever 78 directly to the shaft 92 to allow direct manual control of the cam 68 in the event of failure of motor or electric supply.

Various adaptations of the circuit can be arranged to suit any particular application, e. g. the solenoid-operated switch 84 can be arranged to operate a starter motor relay and a switch can be fitted to be operated by the stud 85 to switch the ignition on and off at the desired point. Also, if desired, the driving motor can be arranged to remain inoperative unless required to drive the control.

Figure 8:
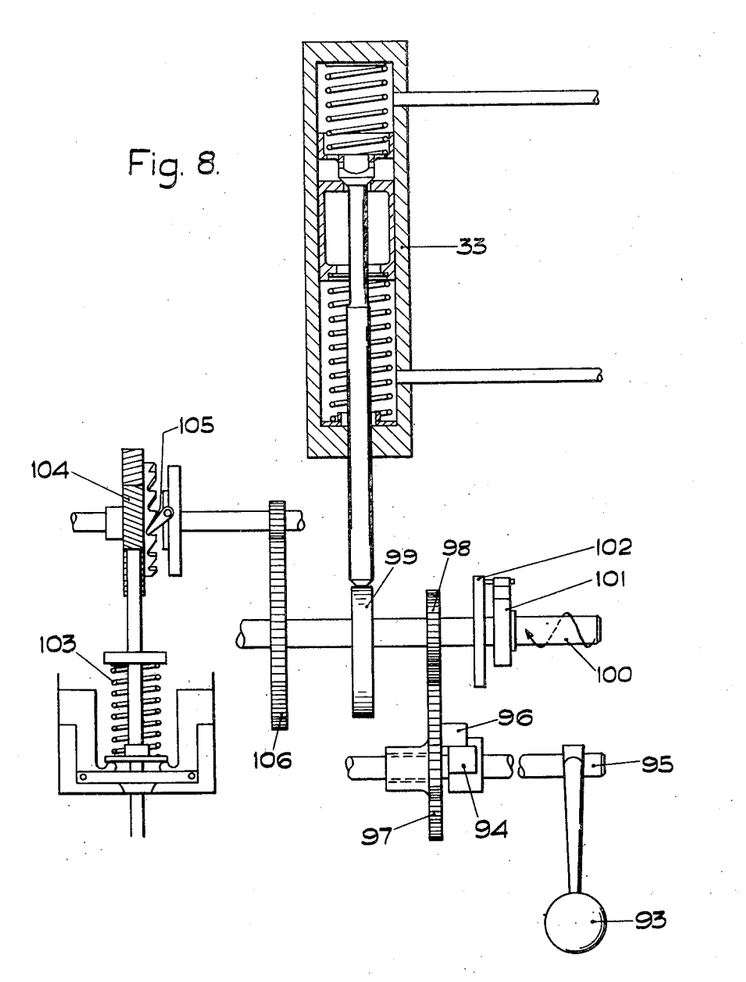
Figure 8 is another modification for regulating the governor loading control valve.

Referring to Figure 8 in which a spring driven follow-up servo-motor is provided for operating the governor loading valve 33 whose construction is the same as the running valve 50 and starting valve 51 as herein described with reference to Figure 6. In this arrangement the control handle 93 rotates an abutment 94 through the shaft 95, said abutment 94 engages a complementary abutment 96 integral with gear segment 97 which in turn is rotatably mounted upon the shaft 95, and engages with pinion 98 for driving the cam 99 through shaft 100. Anchored to the shaft 100 is one end of a spiral spring 101 whose opposite end is fixed to a stationary member 102. This said spring is fully wound when the control lever 93 is at zero position. A governor 103 of a known type which consists of a small spring loaded centrifugal governor, designed to apply a friction load should the speed of rotation tend to rise above a certain value, is adapted to control the rate of movement of the cam 99 through the worm gearing 104, ratchet mechanism 105 and gearing 106 when the spiral spring 101 rotates the shaft 100 as hereinafter set forth.

When the control lever 93 is moved from zero to increase the speed, the abutment 94 moves away from the abutment 96 but the stored energy of the spiral spring 101 now being released rotates the shaft 100 in the direction of the arrow indicated in Figure 8 thus through the gearing 97, 98 the abutment 96 follows on the movement of the abutment 94, until it is again in contact with this said abutment, and the speed at which the shaft 100 rotates is regulated by the governor 103. When the control lever is moved in the reversed direction, that is to say to decreased speed, the cam 99 is actuated through the abutments 94, 96 and gears 97, 98, the governor remaining stationary due to the ratchet 105 slipping, and simultaneously the spiral spring 101 is rewound.

Figure 9:
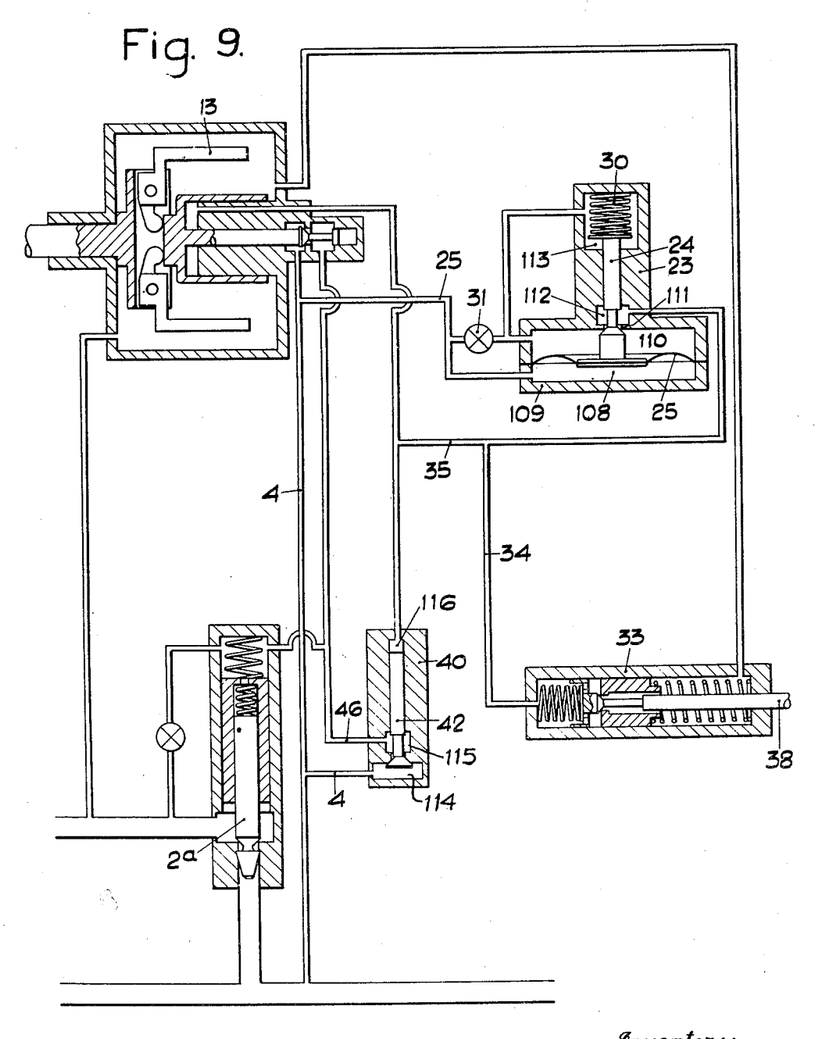
Figure 9 is a modification of the circuit shown in Figure 5.

Referring to Figure 9 the fluid circuit in principle is the same as herein shown with reference to Figure 5, the difference being in the construction of the constant flow valve and the minimum pressure valve. The governor 13, loading relief valve 33, governor by-pass valve 2a and its associated servo-circuit is substantially of the same construction as herein described with reference to Figure 5; and will not be further described, however, a complete circuit is shown in Figure 9 for clarity.

The function of the constant flow valve is to control a supply of fluid, drawn from the high pressure side of the circuit, to ensure that a constant supply free from fluctuations is available for loading the governor. The governor loading relief valve 33 adjusts the pressure of this supply according to the position of the control rod 38. A minimum pressure valve 40 is provided to ensure that the high pressure fuel will not fall to such a value that the loading pressure cannot be maintained.

A connection is made from the high pressure side of the circuit via conduits 4 and 25 to the chamber 108 formed between the diaphragm 25 and the cover 109 of the constant flow valve. Branched from the conduit 25 a connection is made to an orifice 31 and from there to chamber 110 on the opposite side of the diaphragm, i. e. the chamber formed between the diaphragm and the housing 23. From this chamber 110, a port 111 leads to a smaller chamber 112 and from there the supply of fluid for loading the governor is drawn. The port 111 is a cylindrical bore, the edge of which in the chamber 110 forms the seat for the conical headed valve 24, the stem of which is guided in the extension of the cylindrical bore, which forms the port 111 between the chambers 112 and 113. The effective area of the side of the diaphragm in the chamber 110 is smaller than the side in the chamber 108 by the area of the seat for the valve 24. To compensate for this the chamber 113 is connected to chamber 110, thus allowing the pressure acting in chamber 110 to act on the end of the stem of the valve 24 which is the same area as that of the seat. The chamber 113 contains the spring 30, one end of which abuts against the housing 23, the other end against the end of the stem of the valve 24. i. e. the end opposite the conical valve head. The spring 30 thus loads the diaphragm 25 through the valve 24 tending to urge the valve towards the open position. The portion of the stem of the valve 24 between the conical head and that portion of the stem that guided in the cylindrical bore between the chambers 112 and 113 is reduced in diameter to permit free passage for the fluid allowed to pass the conical valve and seat into the chamber 112.

In operation the valve adjusts the flow to maintain a constant pressure drop across the orifice 31, this pressure drop being determined by the effective area of the diaphragm 25 and the force exerted by the spring 30. If this flow should increase, the pressure drop across orifice 31 will increase, thus increasing the pressure difference across the diaphragm, causing the valve 24 to offer a greater restriction to the flow, which will fall until it has again reached its set value when the pressure difference across the diaphragm multiplied by the effective area will again equal the force exerted by the spring. In the event of the flow decreasing, the reverse will occur.

The minimum pressure valve consists of a valve 42 in a housing 40. The valve 42 has a conical head attached to a stem. The conical head obstructs the passage of fluid from the chamber 114, connected to the high pressure side of the circuit via conduit 4, to the chamber 115 connected by the conduit 46 to the control chamber of the by-pass valve. The stem of the valve is guided in a cylindrical bore between the chambers 115 and 116. The port which connects the chambers 114 and 115 and which is obstructed by the conical head of the valve is cylindrical and of the same diameter as the valve stem. The portion of the stem of the valve 42 between the conical head and the part that is guided in the cylindrical bore between the chambers 115 and 116 is reduced in diameter to allow the fluid permitted to pass the valve to have free entry into the chamber 115. The chamber 116 at the end of the valve opposite the conical head is connected via conduit 35 so that the same pressure is acting on it as is loading the governor. In operation the valve is held on to its seat by the high pressure acting on the head of the valve in chamber 114, preventing any flow passing from chamber 114 to chamber 115. The high pressure is normally in excess of the governor loading pressure acting on the end of the valve in chamber 116. Should for any reason, i. e. after sudden deceleration, the high pressure tend to fall below the governor loading pressure, the valve 42 will open and allow fluid to pass from chamber 114 to chamber 115 and thus load the by-pass valve via conduit 46 to maintain the high pressure at a value not less than the governor loading pressure.

Figure 10:
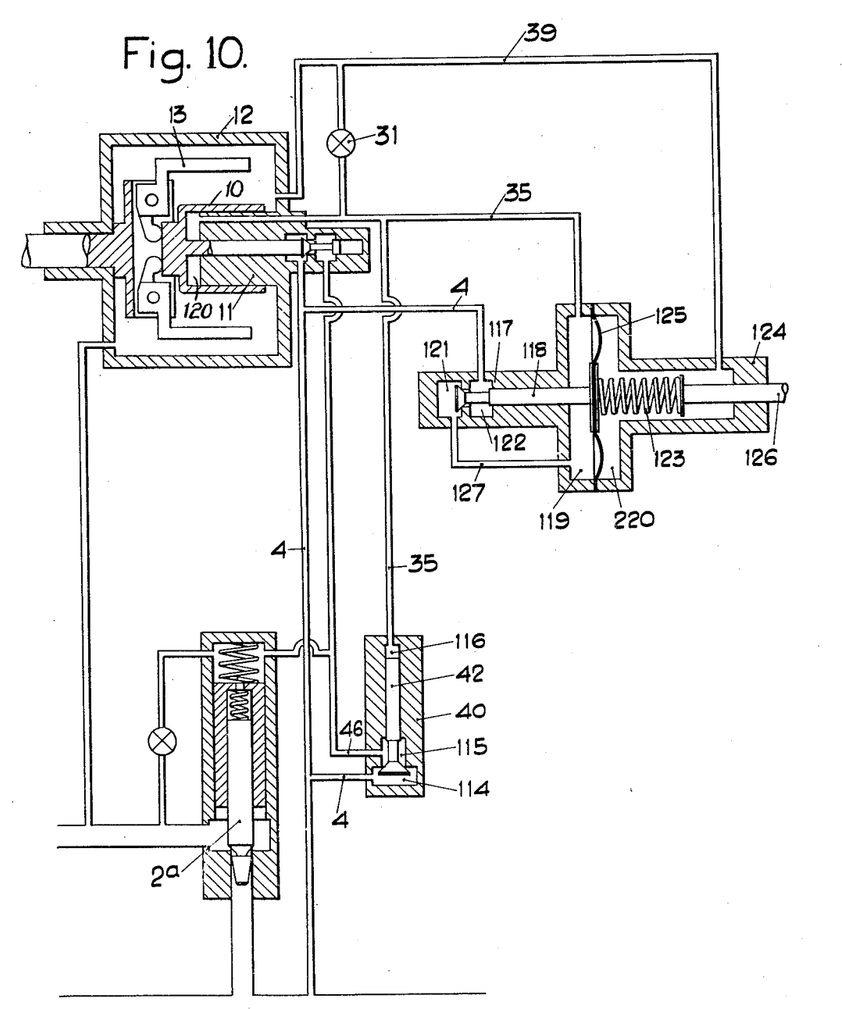
Figure 10 is a still further modified circuit.

The circuit shown in Figure 10 shows a method by which the governor loading is accomplished by using a governor loading control valve to replace the constant flow valve and governor loading relief valve.

The governor 13 and by-pass valve 2a are of the same construction as hereinbefore described with reference to Figure 5.

The governor loading control valve consists of a casing 117 in which slides a valve 118. This valve is formed with a conical head that obturates a port between the chambers 121 and 122 formed in the casing 117. The seat for the conical valve head is provided where a cylindrical bore which connects chambers 121, 122 meets the end of the chamber 121, the portion of this bore between chambers 122 and 119 provides the guide for the stem of the valve 118. The stem of the valve 118 is reduced in diameter between the conical head and the part of the stem that operates in the cylindrical bore between the chambers 122 and 119 to allow free passage for the fluid that is allowed by the valve and seat to pass from chamber 122 to 121. The chamber 119 is formed on one side by the casing 117 and on the other by the diaphragm 125, the valve 118 projects into this chamber and is attached to the diaphragm. A further chamber 220 is formed between the opposite side of the diaphragm 125 and the cover 124 and in this chamber is situated a spring 123, one end of which abuts against the diaphragm 125, the other against the end of a control rod 126 which passes through a guide in the cover 124.

The chamber 122 is connected via conduit 4 to the high pressure side of the circuit. Chamber 119 connects to chamber 121 via conduit 127, and also connects to the chamber 120 formed between the governor loading cylinder 10 and the hub 11 of casing 12 and to an orifice 31 via conduit 35. The chamber 220 is connected to the opposite side of the orifice 31 via conduit 39 and to the low pressure side of the circuit via the governor casing 12.

In operation the valve 118 adjusts the flow through the orifice 31 so that the pressure difference across the diaphragm 125 (which is the same as the pressure difference across the inside and outside of the loading cylinder) multiplied by the effective area of the diaphragm 125 is equal to the load applied by the spring 123, i. e. should the pressure difference rise the spring 123 will be compressed, causing the valve 118 to offer a greater restriction to the flow, thus reducing the pressure difference until a condition of balance has been restored. Should the pressure fall, the reverse will occur. The pressure that the control valve maintains will depend upon the position of the control rod 126 which determines the load exerted on the diaphragm by the spring.

Referring to the schematic sketch shown in Fig. 11 the flow of liquid fuel from the supply tank 128 is by way of conduit 131 to pump 129 through conduits 132, 133 to the engine 127. The control apparatus is indicated by arrows and the reference numerals depicted are substantially the same as herein described with reference to Fig. 5. The fuel supply is drawn from the tank 128 by means of pump 129 which in turn is driven from the engine 127 through shaft 130.

We claim:

1. In a governor controlled fuel system means for regulating the rate of flow of liquid comprising in combination a high pressure supply conduit, a valve casing connected in a branch passage leading from the high pressure supply conduit and to a by-pass passage leading to low pressure, a control valve in said casing which obturates said branch passage and arranged to open and close the communication between the said passages having a valve opening pressure face which is subject to the pressure in the high pressure supply conduit and a valve closing pressure face contained within the valve casing forming the movable wall of a control chamber in said valve casing, the valve closing pressure face having a larger effective area than that of the valve and subjected to the pressure of liquid within the control chamber in said valve casing, a governor housing, a piston provided with a hydraulic chamber fixed in said governor housing, the hydraulic chamber connected in a branch passage leading from the control chamber in said control valve casing and to the by-pass passage leading to the low pressure supply, a constriction in one of these passages, a valve slidably mounted in said stationary piston obturating a passage in the hydraulic chamber for controlling the flow of liquid therefrom to the by-pass passage, a cylinder closed at one end is mechanically coupled to said valve and sliding axially upon said piston provides a hydraulic chamber which communicates through a passage for the external adjustment of the pressure therein, a driven shaft mounted in the governor housing coaxial with said cylinder, a centrifugal governor device carried by the driven shaft in the governor housing, the load of the governor weights applied axially to said sliding cylinder in opposition to the pressure within the second mentioned hydraulic chamber operating the valve in said piston to control the pressure in the control chamber in said valve casing.

2. In a governor-controlled fuel system according to claim 1 including the weights of said centrifugal governor arranged that with an increase of the radius of rotation of their centres of gravity the force exerted in opposition to the hydraulic load in the second mentioned hydraulic chamber is diminished.

3. In a governor-controlled fuel system according to claim 1 including a valve casing connected in a branch passage to the second mentioned hydraulic chamber and a manually adjustable governor loading relief valve in said casing automatically maintaining the hydraulic load on the centrifugal governor at a predetermined value.

4. In a governor-controlled fuel system according to claim 1 including a pressure control means for controlling the rate at which the hydraulic load is applied to the governor so as to obtain controlled rate of acceleration.

5. In a governor-controlled fuel system according to claim 1 including a pressure adjusting means for controlling the hydraulic loading of the governor and means for preventing a fall of pressure below the pressure required in the high pressure supply for maintaining the hydraulic loading of the governor.

6. In a governor-controlled fuel system according to claim 1 including a constant flow valve means for the passage of fluid from the high pressure supply conduit to the low pressure for maintaining a constant flow of liquid within normal working limits and a pressure control means cooperating with said constant flow valve means for hydraulically loading the centrifugal governor at a value for a pre-determined position of said pressure control means.

7. In a governor-controlled fuel system according to claim 1 including the combination of a constant flow valve comprising a valve casing having a large and a small fluid chamber, a flexible diaphragm dividing the large chamber into two compartments, a passage connecting these two compartments through a restricted orifice, a valve mounted in said casing mechanically coupled to said diaphragm controlling the flow of liquid through the smaller chamber from one of the compartments and the other compartment is connected through a passage to the high pressure supply conduit.

8. In a governor-controlled fuel system according to claim 1 including a follow-up means to regulate the rate at which the load opposing the force exerted by the governor may be varied.

9. In a governor-controlled fuel system according to claim 1 including a valve casing connected in a branch passage to the second mentioned hydraulic chamber and a manually adjustable governor loading pressure controlling valve in said casing automatically maintaining the hydraulic load on the centrifugal governor at a pre-determined value.

CYRIL ALPHONSO PUGH.
DOUGLAS GERHARD BOOTH.

REFERENCES CITED

The following references are of record in the file of this patent:

UNITED STATES PATENTS

| Number | Name | Date |
|---|---|---|
| 1,833,265 | Schmidt | Nov. 24, 1931 |
| 2,010,420 | Simmen | Aug. 6, 1935 |
| 2,081,188 | Walker | May 25, 1937 |
| 2,136,959 | Winfield | Nov. 15, 1938 |
| 2,153,381 | Maas | Apr. 4, 1939 |
| 2,155,247 | Warner | Apr. 18, 1939 |
| 2,165,657 | Schaeren | July 11, 1939 |
| 2,260,576 | Maybach | Oct. 28, 1941 |
| 2,336,968 | Smith | Dec. 14, 1943 |